Sept. 30, 1969     KARL-HEINZ BURGER     3,469,469

WORM GEARING WITH ANTI-BACKLASH MEANS

Filed April 24, 1968

INVENTOR
Karl-Heinz BURGER
By

Michael S. Striker his ATTORNEY

United States Patent Office 3,469,469
Patented Sept. 30, 1969

3,469,469
WORM GEARING WITH ANTI-BACKLASH MEANS
Karl-Heinz Burger, Buhl, Germany, assignor to Robert Bosch GmbH, Stuttgart, Germany
Filed Apr. 24, 1968, Ser. No. 723,679
Claims priority, application Germany, May 5, 1967, B 92,364
Int. Cl. F16h 55/18, 55/22, 1/16
U.S. Cl. 74—409                    12 Claims

ABSTRACT OF THE DISCLOSURE

A drive arrangement for windshield wipers includes a rotatable worm gear and a rotatable worm wheel arranged adjacent to the worm gear. The worm wheel is mounted with slight freedom of axial movement toward and away from the worm gear and has one axial side which faces the latter, and an other axial side facing away from the worm gear. An annulus of gear teeth is provided on the one side of the worm wheel meshing with the worm gear and continuously diverging in direction from the one towards the other side of the worm wheel. Biasing means maintains the worm wheel in mesh with the form gear by preventing the movement of the worm wheel in axial direction away from the worm gear.

Background of the invention

The present invention relates to drive arrangements in general, and more particularly to drive arrangements for the windshield wipers of automotive and other vehicles. Still more particularly, it relates to a drive arrangement utilizing a worm drive.

In many drive arrangements a worm drive is utilized wherein a worm gear meshes with the annulus of gear teeth provided on a worm wheel. In such a drive arrangement is utilized in applications with periodically changing load, as is the case in drive arrangements for windshield wipers, it is quite common to find that the worm drive develops objectionable noises if there is a significant backlash of the flanks between the teeth of the worm gear and those of the worm wheel. Not only are such noises generally objectionable, but this backlash is of course damaging to the gear components. The distribution in the size values of the backlash and the relative angular displacement between worm gear and worm wheel resulting therefrom is a product of the tolerances of the axial spacing, the alignment and the tooth construction on the gear components; it cannot be maintained at any desirably small level by production control alone because this would make the gear construction more expensive than is economically feasible.

For this reason it has already become known in the art to mount the gear wheel with some freedom of axial movement and to subject it to a resilent biasing means which maintains it in engagement with the worm gear without freedom of play. However, the gear arrangements in which this is known are intended for the fine adjustment of apparatus and machines and these arrangements are not subject to any significant load but rather serve only for the precise transmission of a movement. In these known constructions the teeth of the worm wheel are produced with a worm milling device having the same pitch circle diameter as the worm gear itself; on cutting of the teeth this milling device assumes the same position with respect to the axis of the worm wheel as will be taken up by the worm gear later on. By this expedient the annulus of gear teeth provided on the worm wheel receives a profile which is conformed to the cylindrical generatrix of the worm gear so that, if the tolerance grouping is good, the teeth of the gear wheel mesh well with the flanks of the teeth on the worm gear. If the tolerance grouping is less advantageous and increases the play between the tooth flanks, the biasing means shifts the worm wheel with reference to the worm gear to such an extent that only that lateral portion of the annulus of gear teeth engages with the worm gear which faces towards the biasing means. However, this brings with it the possibility that the teeth of the worm wheel will contact the roots of the teeth on the worm gear with resulting jamming of the gear arrangement.

It is the general object of the present invention to provide a drive arrangement of the type here in question in which the play between the tooth flanks on the teeth of the worm wheel and those of the worm gear may be reduced to any desired value without incurring the possibility that this might result in jamming of the drive arrangement.

Summary of the invention

In accordance with one feature of my invention I provide, in a drive arrangement which is particularly suitable for windshield wipers, a combination which comprises a rotatable worm gear having a first axis of rotation and a rotatable worm wheel which is arranged adjacent to the worm gear and which has a second axis of rotation inclined to the first axis. The worm wheel is mounted with slight freedom of axial movement toward and away from the worm gear and has one axial side which faces the worm gear and another axial side which faces away from the worm gear. On the one side of the worm wheel, that is the side facing the worm gear, there is provided an annulus of gear teeth which mesh with the worm gear and which continuously diverge radially outwardly in direction from the aforementioned one towards the aforementioned other side. Biasing means acts upon the other side of the worm wheel in a sense tending to deflect the worm wheel towards the worm gear so that the gear teeth of the worm wheel remains in mesh with those of the worm gear.

By resorting to my invention a satisfactory engagement between the teeth of the worm wheel and those of the worm gear is obtained over a wide range of tolerances. It will be appreciated, of course, that the biasing means for the worm wheel may be adjustable manually, or that it may be an automatically adjusting biasing means, that is a suitabe springy member which presses against the worm wheel in axial direction in a biasing sense. In the latter case backlash or play between the worm gear and the worm wheel is completely eliminated. In this case it is necessary, however, that the teeth be so constructed that forces acting upon the teeth of the worm wheel during operation of the drive arrangement tend to bias the worm wheel out of engagement with the worm gear, that is that these forces act in opposition to the biasing means in a sense attempting to increase the backlash between the gear tooth flanks.

I have found that in accordance with my invention it may be sufficient, where simpler gear arrangements are involved, to construct the annulus of gear teeth on the worm wheel conically which results initially in a point-contact of the teeth of the annulus with those of the worm gear. However, where drive arrangements are intended for greater loads, the invention provides that the teeth of the worm wheel are produced with a hob whose pitch circle diameter is greater than that of the worm gear and whose axis of rotation remains during the milling operation forwardly of the plane of that axial side of the worm wheel which faces away from the biasing means, that is which faces away from that other axial side which is later to be engaged by the biasing means when the worm wheel forms part of a worm drive. By resorting to this latter feature of the invention the area of contact between the teeth of the worm wheel and those of the worm gear is increased with a concomitant reduction of the contact pressure, and the possibility of jamming of the gear components is eliminated.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Description of the preferred embodiments

Figure 1:
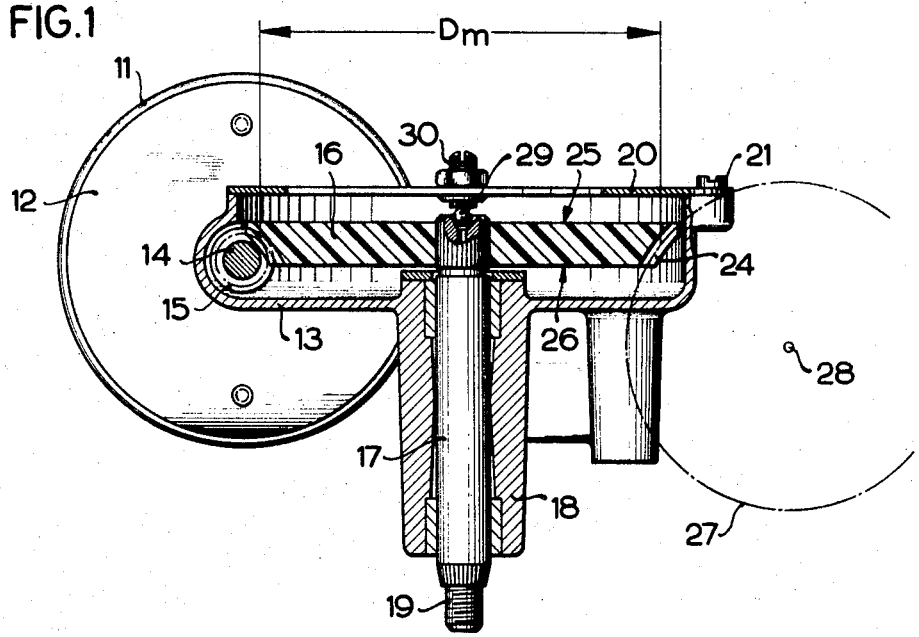
FIG. 1 illustrates a first embodiment of my invention in a partly sectioned view.

Discussing now the drawing in detail, and firstly the embodiment illustrated in FIG. 1 thereof, it will be seen that reference numeral 11 identifies a somewhat schematically illustrated cylindrical housing of a drive motor. At one axial end the housing 11 is closed by a flange 12 of a further housing 13 which latter accommodates the worm drive. The drive motor which is not illustrated but which will be understood to be located within the housing 11 has a drive shaft 14 which extends out of the housing 11 into the housing 13 and which is therein provided with a worm gear 15 which meshes with a worm wheel 16. The worm wheel 16 is mounted rigid with a shaft 17 which in turn is mounted rotatably and axially slidable in a cylindrical projection 18 of the housing 13. It will be noted that the shaft 17 extends outwardly beyond the projection 18 and is provided at its free end 19 with means for connecting thereto a crank arm which, when the arrangement is in operation, will drive two windshield wipers (not illustrated) via suitable connecting rods which also are not illustrated as not forming a part of the invention. The housing 13 is provided with a cover 20, for instance of sheet metal, which is releasably secured to the housing 13 by means of screws 21 (one shown).

In accordance with the invention, the worm wheel 16 is provided with an annulus of gear teeth 24 on that side of the worm wheel 16 which faces towards the worm gear 15. The annulus of gear teeth 24 continuously converges radially inwardly in the direction from the axial side 25 towards the axial side 26 of the worm wheel 16. To obtain this configuration the individual teeth of the annulus of teeth are produced with a hob whose pitch circle diameter is indicated for better understanding with reference numeral 27 and outlined in phantom lines. It is clear from FIG. 1 that this pitch circle diameter is significantly larger than the corresponding diameter of the worm gear 15 and that the axis of rotation of the hob will remain forwardly of the plane of the axial side 26 of the worm wheel during milling operations carried out with this hob.

The annulus of gear teeth 24 is so configurated that its median pitch circle diameter Dm substantially corresponds to the theoretically calculated value derived from the axial spacing between the worm gear 15 and the worm wheel 16 and from the pitch circle diameter of the worm gear 15.

In the embodiment of FIG. 1 a steel ball 29 is located in a recess provided in an axial end face of the shaft 17 adjacent the cover 20, and a screw 30 abuts against the ball 29 and is threadedly guided on the cover 20. It is clear that the screw 30 and the ball 29 exert a pressure on the shaft 17 and thereby on the worm wheel 16 which is rigid therewith, such pressure serving to maintain the teeth of the worm wheel in engagement with the teeth of the worm gear 15. A variation in the play between the flanks of the gear teeth on the worm gear 15 and on the worm wheel 16, and in the consequent relative angular displacement between worm gear 15 and worm gear 16 can be effected simply by threading the screw 30 through the cover 20 to a greater or lesser degree. This makes it possible to adjust the relative angular displacement between the two components of the worm drive to the respectively desired value, independent of the tolerances of the axial spacing, the alignment and the tooth construction.

Figure 2:
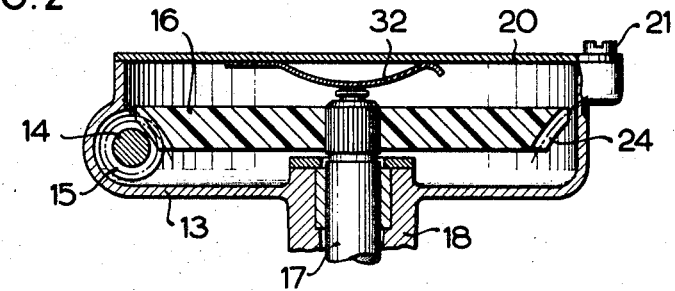
FIG. 2 is a fragmentary sectioned view somewhat similar to FIG. 1 but illustrating a further embodiment of the invention.

Coming now to the embodiment of FIG. 2 it will be seen that this is substantially the same as that shown in FIG. 1. For this reason the components shown in FIG. 1 but not directly concerned with the invention, such as the housing 11, have been omitted. The main difference between the embodiment of FIG. 2 and that shown in FIG. 1 is that the embodiment of FIG. 2 utilizes a self-adjusting biasing means, namely a leaf spring 32. In this embodiment the drive is so constructed that the forces acting upon the teeth of the worm wheel 16 in operation of the drive attempt to press the worm wheel 16 out of engagement with the worm gear 15 in opposition to the biasing action of the spring 32. It will be understood that with this construction, relative angular displacement between worm gear 15 and worm wheel 16 is completely eliminated which naturally results in a particularly quiet and even operation of the drive.

An added advantage of the construction shown in FIG. 2 is the fact that an externally applied force cannot reverse the direction of movement of the drive because the application of such a force would serve to pull the gear wheel into the teeth of the worm gear with resultant jamming of the drive. It is therefore not necessary to construct the drive of FIG. 2 as a self-locking drive in the customary manner wherein the teeth are provided with a low pitch angle.

Figure 3:
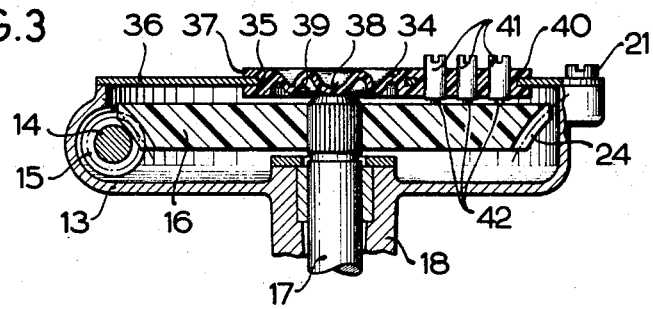
FIG. 3 is a view similar to FIG. 2 but illustrating yet an additional embodiment of the invention.

Coming, finally, to the embodiment shown in FIG. 3 it will be seen that this differs from FIG. 2 in that the self-adjusting biasing means, which in FIG. 2 is the leaf spring 32, is in FIG. 3 provided as a membrane or diaphragm 34 consisting of synthetic plastic material and provided, for instance by injection molding, in an opening 35 of the sheet metal cover 36. This construction is a most simple manner, particularly suitable for mass production methods, of making the biasing means and connecting it with the remainder of the device. The utilization of such a diaphragm of synthetic plastic material as biasing means, and the manner in which it can be secured to the remainder of the device, is possible not only in a drive arrangement according to the present invention, but also in conventional drive arrangements know from the prior art and utilizing such biasing means.

As FIG. 3 clearly shows the membrane 34 is provided with a reinforced annular marginal portion 37 which overlaps the marginal zone of the cover 36 bordering the opening 35 therein. This overlapping will be seen to be provided on both axial sides of the opening. The membrane 34 is provided with a centrally arranged peak 38 which is connected with the remainder of the membrane, or more specifically with the annular marginal zone 37, thereof, via an annular fold 39 so as to be axially elastically deflectible. This peak 38 engages the end face of the shaft 17 with a spring action, quite in the manner of the leaf spring 32 of FIG. 2, and effects an engagement between the worm wheel 16 and the worm gear 15 which is free of play, also in the manner discussed with respect to FIG. 2.

In accordance with a further feature of the invention, the reinforced annnular marginal zone 37 of the membrane 34 is provided at one location with an extension 40 which serves for receiving electrical terminals 41 which are firmly anchored therein. FIG. 3 shows that the terminals 41 extend through the extension 40 and that downwardly of the membrane 34, that is in the interior of the housing 13, they are constructed as elastically slidable contacts 42 which cooperate with contact surfaces (not illustrated) on the worm wheel 16. The provision of such sliding contacts and contact surfaces in this manner is advantageous because the use of auxiliary parts for anchoring and insulating the terminals 41 is eliminated and the construction is thereby particularly simple and inexpensive. It will be understood that the contacts 42 and the contact surfaces together constitute the so-called "limit switch" which serves to switch off and effect braking of the motor (see FIG. 1) when the wipers have reached their desired terminal position.

It will be understood that each of the elements described above, or two or more together, may also find a useful application in other types of constructions differing from the types described above.

While the invention has been illustrated and described as embodied in a drive arrangement which is particularly suitable for windshield wipers, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaining and range of equivalence of the following claims.

What is claimed as new and desired to be protected by Letters Patent is:

1. In a drive arrangement, particularly for windshield wipers, a combination comprising a rotatable worm gear having a first axis of rotation; a rotatable worm wheel arranged adjacent to said worm gear and having a second axis of rotation inclined to said first axis, said worm wheel being mounted with slight freedom of axial movement toward and away from said worm gear and having one axial side facing said worm gear and another axial side facing away therefrom, and an annulus of gear teeth provided on said one side meshing with said worm gear and continuously diverging radially outwardly in direction from said one towards said other side; and means operative for maintaining said gear teeth of said worm wheel in mesh with said worm gear.

2. In a drive arrangement as defined in claim 1, wherein said gear teeth diverge conically in direction towards said other side.

3. In a drive arrangement as defined in claim 1, and further comprising a rotatable shaft, said worm wheel being mounted on said shaft for rotation therewith about said second axis.

4. In a drive arrangement as defined in claim 3, said shaft with said worm wheel thereon having slight freedom of axial movement so that said one axial side of said worm wheel may shift towards and away from said worm gear; and wherein said means comprises abutment means engaging an end portion of said shaft in a sense tending to shift said one side toward said worm gear.

5. In a drive arrangement as defined in claim 4, said end portion of said shaft extending beyond said other axial side of said worm wheel.

6. In a drive arrangement as defined in claim 5; further comprising a housing having an outer wall surrounding an interior chamber, said worm gear and worm wheel being located in said chamber; and wherein said abutment means comprises a screw-threaded member threaded through said wall means substantially axially aligned with said shaft and having a leading portion engaging said end portion of said shaft.

7. In a drive arrangement as defined in claim 5; further comprising a housing having an outer wall surrounding an interior chamber, said worm gear and worm wheel being located in said chamber; and wherein said abutment means comprises a biasing member carried by said wall and at least partly located in said chamber, said biasing member engaging said end portion of said shaft and biasing the same in a sense tending to shift said one side toward said worm gear.

8. In a drive arrangement as defined in claim 7, wherein said basing member is a leaf spring.

9. In a drive arrangement as defined in claim 7, wherein said wall is provided with an aperture registering with said end portion of said shaft; said biasing means comprising an elastic diaphragm secured to said wall closing said opening and biasingly engaging said end portion of said shaft.

10. In a drive arrangement as defined in claim 7, said biasing means comprising an elastic diaphragm mounted on said arrangement at least partly located in said chamber and biasingly engaging said end portion of said shaft.

11. In a drive arrangement as defined in claim 10, said diaphragm consisting of synthetic plastic material.

12. In a drive arrangement as defined in claim 10, said diaphragm being of one-piece construction and comprising a holding portion adapted to hold electric terminal means.

References Cited

UNITED STATES PATENTS

| | | | |
|---|---|---|---|
| 2,651,212 | 9/1953 | Mackmann | 74—425 |
| 2,812,668 | 11/1957 | Holt | 74—458 |
| 3,220,277 | 11/1965 | Dixon | 74—409 X |
| 3,301,081 | 1/1967 | Kern. | |

LEONARD GERIN, Primary Examiner

U.S. Cl. X.R.

74—425, 458